Figure 1:
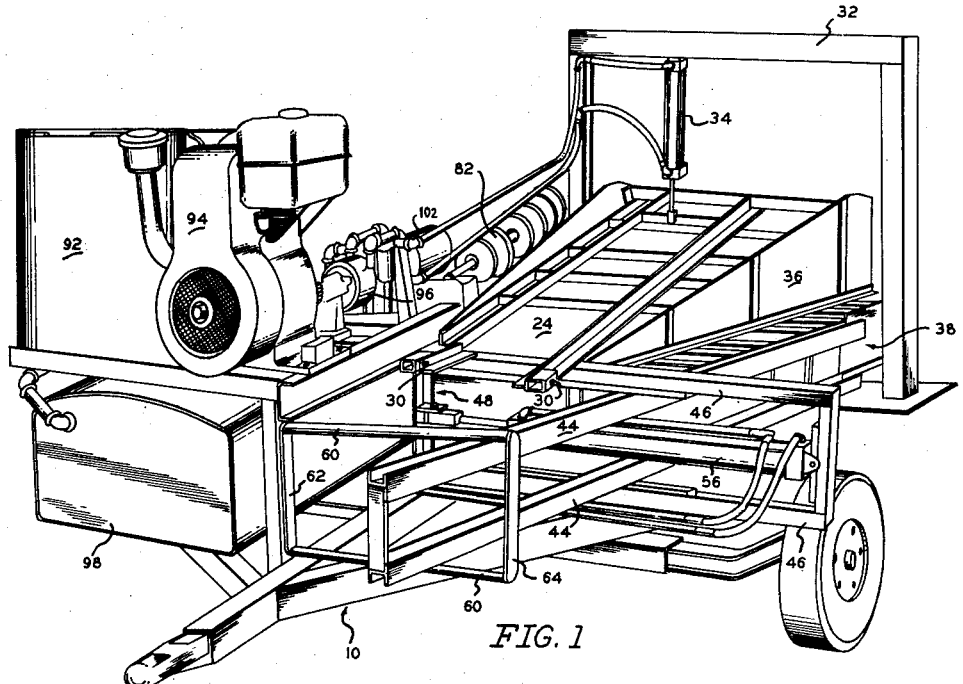

Oct. 13, 1964 E. B. BRICILLO ETAL 3,152,538
CHRISTMAS TREE FOLDER AND WRAPPER
Filed Jan. 16, 1962 3 Sheets-Sheet 1

INVENTORS
*EUGENE B. BRICILLO*
*LEONARD GOCHANOUR*

BY *Beaman & Beaman*

ATTORNEY

Oct. 13, 1964  E. B. BRICILLO ETAL  3,152,538
CHRISTMAS TREE FOLDER AND WRAPPER
Filed Jan. 16, 1962  3 Sheets-Sheet 2

INVENTOR
EUGENE B. BRICILLO
LEONARD GOCHANOUR

BY Beaman & Beaman

ATTORNEY

Oct. 13, 1964  E. B. BRICILLO ETAL  3,152,538
CHRISTMAS TREE FOLDER AND WRAPPER
Filed Jan. 16, 1962  3 Sheets-Sheet 3

INVENTOR
EUGENE B. BRICILLO
LEONARD GOCHANOUR

BY *Beaman & Beaman*

ATTORNEY

United States Patent Office 3,152,538
Patented Oct. 13, 1964

3,152,538
CHRISTMAS TREE FOLDER AND WRAPPER
Eugene B. Bricillo, 935 Brown Road, Jonesville, Mich., and Leonard Gochanour, 93 N. Norwood St., Hillsdale, Mich.
Filed Jan. 16, 1962, Ser. No. 166,617
11 Claims. (Cl. 100—8)

The invention pertains to a machine for folding the branches of trees adjacent to the trunk and wrapping the tree to maintain the branches in the folded or compressed condition for transport or storage purposes. The apparatus of the invention is particularly adapted for use with the folding and wrapping of Christmas trees. However, it may be employed with any type of tree or bush capable of being folded without damage to the branches.

The extensive shipping and transporting of Christmas trees and the considerable distances which Christmas trees are often transported, makes it highly desirable that such trees be shipped in their most compressed and space-saving form. The resilient nature of the branches of Christmas trees and many other types of trees and bushes permits the branches to be folded or bent upwardly and toward the trunk of the tree a considerable distance without damage thereto, and it has become common practice to fold Christmas tree branches in such a manner and by wrapping or tying means to maintain the branches in this form for shipping. By folding and wrapping a tree in the compressed and space-saving form, tree branches will also be protected from damage during transport, thereby increasing the market value as well as reducing the transport cost.

Several devices have been proposed to aid in the folding and wrapping of the branches of Christmas trees. However, heretofore known devices have not proved practical, and many problems have plagued this type of apparatus which have not been overcome in a commercially practical manner. Funnel shaped devices have been employed to fold tree branches and maintain the same in a folded position while the branches were manually tied. Such devices are very cumbersome and require considerable time and effort to fold and wrap a tree. Other Christmas tree wrapping machines have been devised wherein the tree is inserted into the apparatus and twine or other tying means is helically passed about the branches to pull the same adjacent the trunk. This type of wrapping machine has not proven practical due to the wide variation in sizes of Christmas trees, the high branch breakage that often occurs and other operational difficulties due to the size and complexity of the apparatus.

It is an object of the invention to provide a fully portable tree wrapping and folding machine which is capable of handling a very wide range of trees, and wherein the branches thereof may be properly folded as to minimize breakage, and wherein the wrapping of the branches minimizes the tree bulk and damage to the tree during transport and storage.

A further object of the invention is to provide a tree folding and wrapping machine wherein power means accomplish the compression and folding of the branches to a position adjacent the trunk and automatic wrapping and tying means are employed to maintain the branches in the folded position.

Yet another object of the invention is to provide a tree folding and wrapping machine wherein the tree may be very easily loaded into the machine and will be automatically ejected during the operational sequence of the next cycle of the machine.

Another object of the invention is to provide a tree folding and wrapping machine which sequentially folds the branches of the tree in directions perpendicularly disposed to each other and wherein the means folding the tree automatically folds the branches in a manner which minimizes branch breakage and at least one of the folding means adjusts itself to the tree configuration during operation.

Yet another object of the invention is to provide a tree folding and wrapping machine which may be fabricated from readily available components and employs standard wrapping and tying devices which are readily available on the commercial market.

Figure 2:
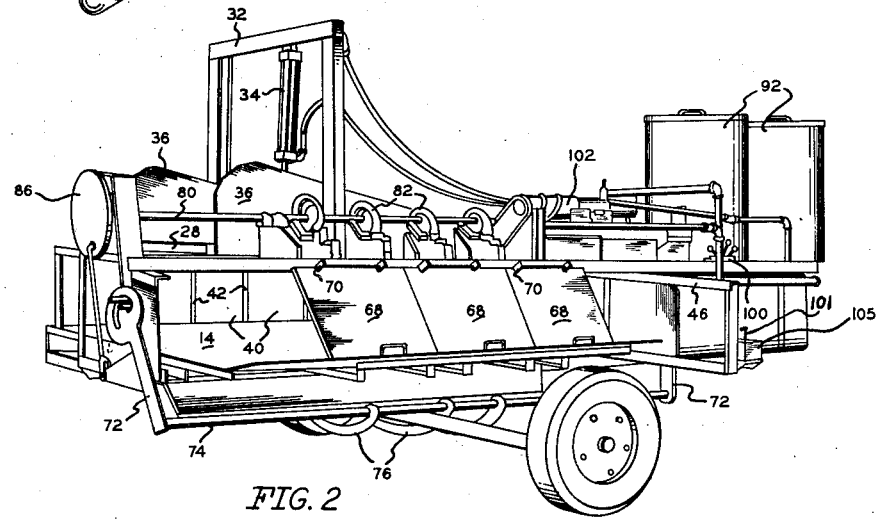
Figure 3:
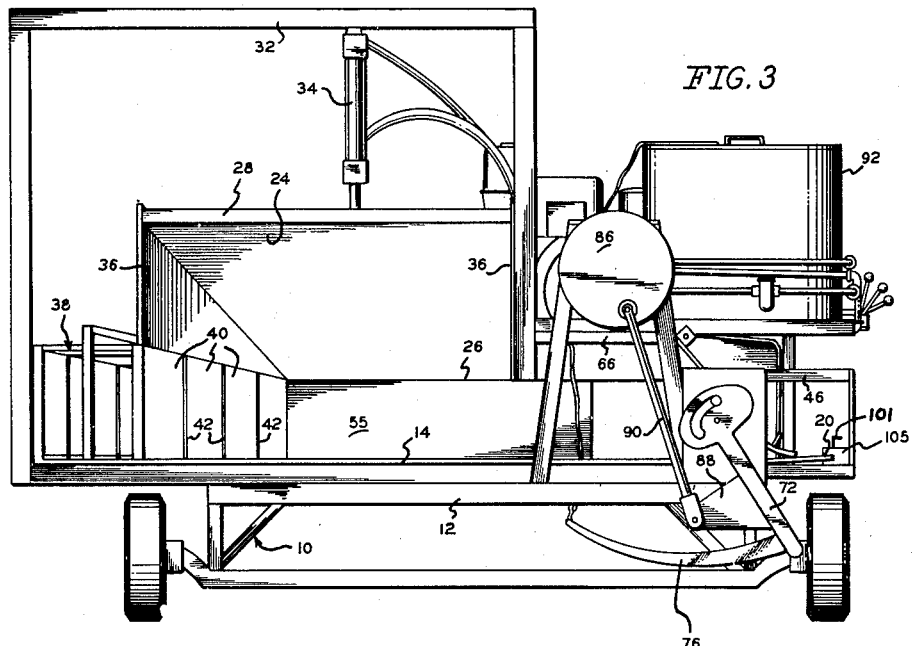
Figure 5:
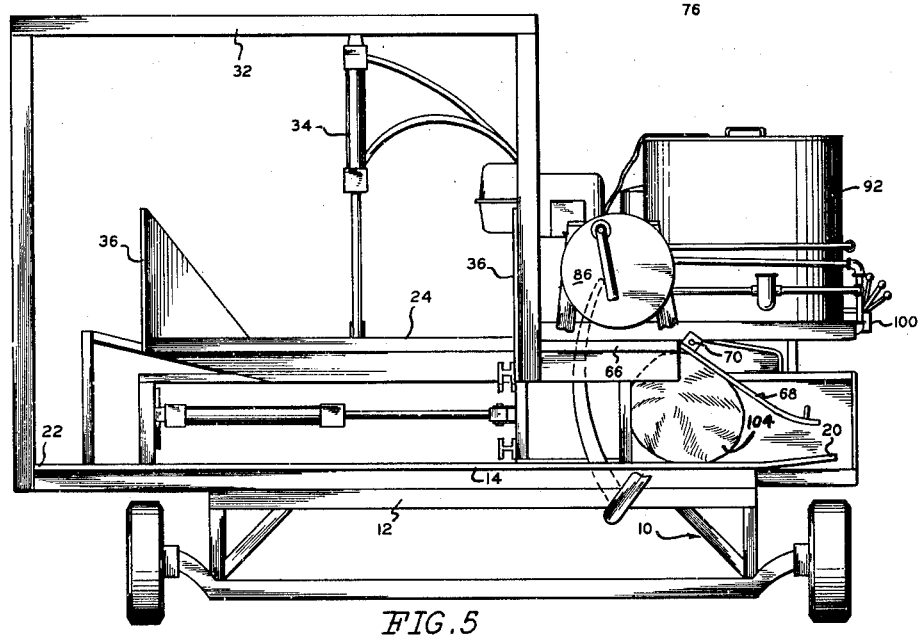
Figure 4:
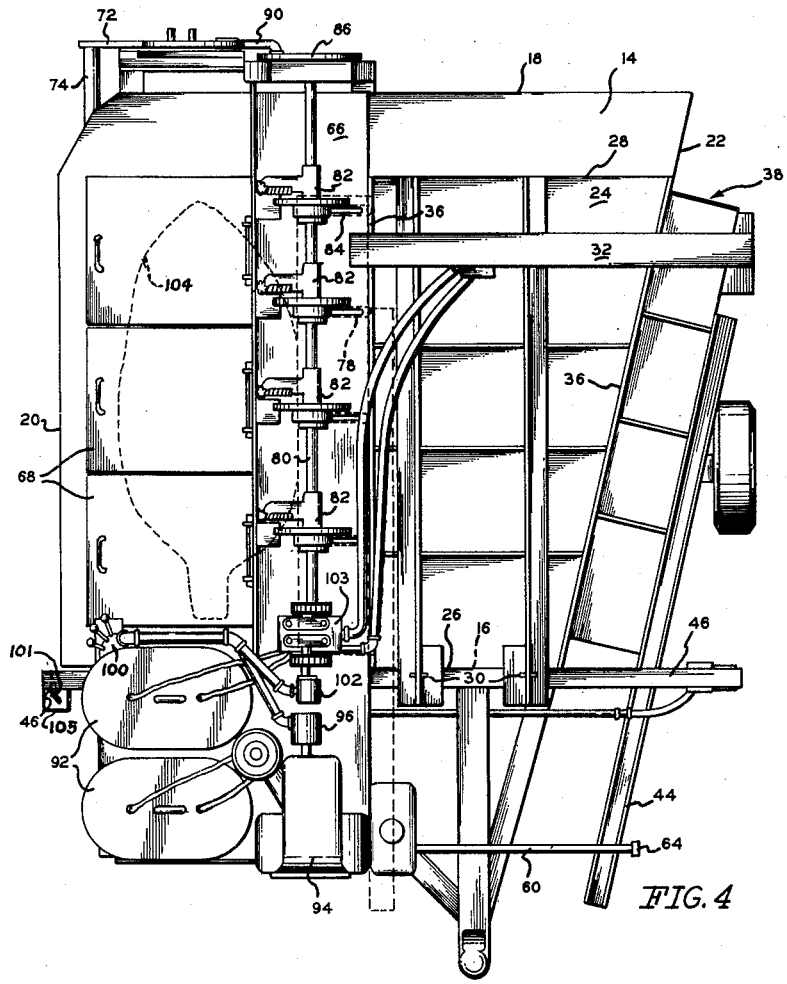
Figure 6:
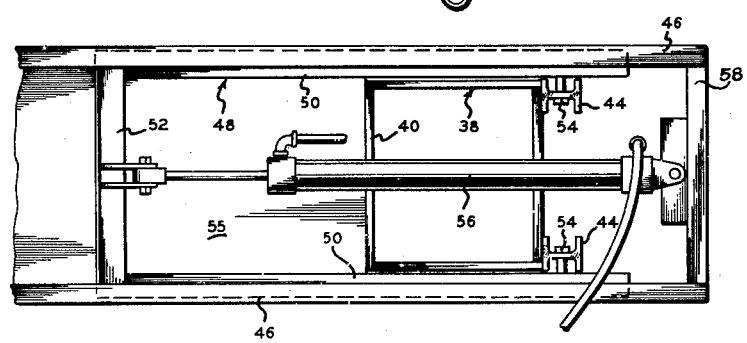

These and other objects of the invention arising from the details and relationships of the components of an embodiment thereof will be apparent from the following description and accompanying drawings wherein:

FIG. 1 is a front and side perspective view of a tree folding and wrapping machine in accord with the invention, FIG. 2 is a rear and side perspective view of the machine in accord with the invention, FIG. 3 is an elevational rear view of the tree folding and wrapping machine in accord with the invention showing the movable plate and wall members in the retracted position for receiving a tree within the tree receiving chamber, FIG. 4 is a top plan view of the tree folding and wrapping machines showing a tree in the wrapping position and the movable side wall in the compressing position in dotted lines, FIG. 5 is an elevational rear view, partly broken away, of the machine in accord with the invention at the end of the compression stroke of the side wall wherein the tree is located within the wrapping chamber and during tying of the tree, and FIG. 6 is an elevational, enlarged detail view of the side wall guide and slide pivot support means.

In that a machine for folding and wrapping Christmas trees should be located as near as possible to the trees being cut, the machine is preferably built in the form of a trailer which may be readily towed by a truck or other vehicle. The frame 10 is mounted upon an axle supported on pneumatic tires and the frame may consist of a number of conventional channel, box, and angle members welded together to form a rigid structure.

The frame includes transversely extending cross pieces 12 and a horizontally disposed bottom plate 14 is affixed to the cross pieces. The bottom plate 14 is provided with a front edge 16 and substantially parallel rear edge 18, and the right edge 20 will be substantially perpendicularly disposed to the edges 16 and 18. The left plate edge 22, in opposed relation to the side edge 20, may be obliquely related to the edge 18 as shown in FIG. 4. It will be appreciated that the bottom plate 14 substantially extends the width of the machine.

A four-sided top plate 24 of trapezoidal configuration having parallel front and end edges 26 and 28, respectively, is pivotally mounted to the frame on an axis parallel to and spaced above the front edge 16 of the bed plate. The top plate 24 is pivotally mounted to the frame by means of pivot bolts 30, and a bridge member 32 mounted on the machine extending over the top plate serves as a support for a hydraulic expansible motor 34 interposed between the bridge and the top plate for raising and lowering the top plate relative to the bottom plate 14. The pivotal mounting of the top plate 24 permits the rear edge 28 of the top plate to be held in its uppermost position, FIG. 3, or lowered to its lowermost position, as shown in FIG. 5. In the lowermost position the top plate 24 will be substantially parallel to the bottom plate 14.

Wedge shaped plates 36 are fixedly mounted to the frame and permit the top plate to move up and down therebetween. The purpose of the plates 36 is to confine the branches of the tree being folded under the top plate and prevent the branches from being pinched between the top plate and the side wall or other portions of the frame.

A movable side wall or ram 38 is mounted upon the frame for movement in a horizontal direction across the bottom plate 14 and is so moved upon the top plate 24 being lowered to the position of FIG. 5. The side wall 38 is constructed in the form of an open structural box whereby the tree engaging surface consists of a plurality, four being shown in the illustrated embodiment, of plates 40 divided by slots 42 which permit the arms of the wrapping device to pass between the plates 40 and permit wrapping of the tree as will be described later. The side wall 38 is pivotally mounted to the frame by a pair of longitudinally extending I-beam members 44 which are attached to the side wall and extend toward the front of the machine, FIG. 4.

The apparatus for pivotally mounting the side wall 38 is best appreciated from FIGS. 1 and 6. This structure includes a pair of members 46 transversely mounted on the frame in parallel spaced relation and extend the width of the machine. The members 46 are of a U-cross section having the open portion of the U in opposed facing relation as to form a guideway to receive a U-shaped slide member 48 therebetween. The slide 48 consists of upper and lower members 50 which are slidably received within the guideway members 46 and a vertical element 52 extends between the members 50. Pivot bolts 54 are mounted in the members 50 and cooperate with the I-section members 44 to pivotally mount the side wall 38 with respect to the slide 48. The slide 48 may be moved as a unit transversely with respect to the machine by means of a hydraulic expansible motor 56 affixed at one end to a bracket 58 bridging the guide members 46 and the piston thereof is attached to the member 52 mounted to the slide members 50. Thus, as the piston of the motor 56 is extended or contracted, the slide 48 and the side wall 38 may be moved back and forth across the machine. A tree butt abutment plate 55 is mounted on the slide 48 and extends to the left, FIG. 6, for guidance by members 46 to form the end of the tree receiving chamber.

The forward ends of the I-members 44 extend into a rectangular box defined by horizontally disposed members 60 and vertically disposed members 62 and 64. The members 60, 62, and 64 are fixed with respect to the frame of the machine and the members 62 and 64 will be selectively engaged by the free end of the members 44. The engagement of the free end of the member 44 with the members 62 or 64 will produce a pivoting action of the side wall 38 as will be described later.

An upper plate 66 is affixed to the frame in parallel spaced relation to the bottom plate 14 adjacent the edge 20 thereof. The upper plate 66 is disposed at a height above the bottom plate corresponding to the position of the top plate 24 when in its lowermost form, as shown in FIG. 5.

A plurality of doors 68 are hingedly mounted to the machine framework adjacent the outer edge of the upper plate 66. The doors 68 are pivotally connected to the frame at 70, FIGS. 4 and 5, and will be maintained in the closed position, as illustrated, by gravity. The doors are of a length such that they will be maintained in the inclined position, as shown in FIG. 5, wherein the lower edge of the door engages the upwardly inclined portion of the bottom plate 14 adjacent the edge 20.

Thus, that portion of the bottom plate 14 in opposed relation ot the top plate 24, as shown in FIG. 3, the top plate 24, the side wall 38, and the abutment plate 55, define a tree receiving chamber with the top plate in the uppermost position. The portion of the bottom plate 14 in opposed relation to the upper plate 66, the upper plate 66 and the doors 68 define a wrapping chamber for the tree.

The means for wrapjping and tying the branches of the Christmas tree for maintaining the branches in the folded and compressed state includes conventional tying and knotting apparatus as used with hay baling machines and the like. To this end, a pair of levers 72 are pivotally mounted on the frame of the machine and are connected at their outermost ends by a shaft 74. A plurality of arcute needle members 76 are fixedly mounted on the shaft 74 and normally extend under the bottom plate 14. The bottom plate is provided with a plurality of slots 78, FIG. 4, which permit the needles to be inserted through the bottom plate and through the box-like configuration of the side wall during the wrapping and tying of the tree, as shown in FIG. 5. During the wrapping and tying operation, the slots 42 between the plates 40 of the side wall 38 will be aligned with the slots 78 defined in the bottom plate whereby neither the bottom plate nor the side wall will interfere with the needle movement. The tying mechanism also includes a shaft 80 which is rotatably mounted upon the machine frame by conventional bearing means. The shaft 80 is associated with a plurality of conventional twine knotters 82 which are of the type employed with hay baling machines, and cooperate with the needles 76 to permit twine to be tied about a tree compressed and held in the wrapping chamber. The upper plate 66 is also provided with slots 84 for receiving the ends of the needles whereby the needles may be positioned adjacent the knotters for knotting and cutting. The rear end of the shaft 80 is provided with a crank member 86 which is linked to an extension 88 of the rear lever 72 by rod 90. Thus, upon each rotation of the shaft 80 to actuate the knotters 82, the needles 76 will be swung up into the operative position, as shown in FIG. 5, wherein the ends of the needles extend through slots 84, the twine which is now passed about the tree branches is knotted and cut and the needles are then lowered to the inoperative position.

A pair of twine containers 92 are mounted upon the framework for containing the twine used in tying the trees and suitable guide means are employed for feeding the twine to the needles. Also, an internal combustion engine 94 is mounted upon the frame in driving connection with a hydraulic pump 96. The pump is supplied from a fluid reservoir 98 and by means of plumbing the output of the pump 96 is connected to control valves 100 which control the flow of fluid to the expansible motors 34 and 56. A rotary hydraulic motor 102 is in driving connection with the end of the shaft 80 through a manually operated clutch 103 to produce the shaft 80 rotation, and valve control means 105 are employed to energize motor 102 from the output of pump 96 upon plate 55 engaging the control lever 101 of valve 105 upon shifting of the slide 48 to position a tree in the wrapping chamber. The control lever 101 projects into the path of movement of plate 55 and is therefore engaged thereby.

During operation of the machine the components thereof will initially be as shown in full lines in FIGS. 1, 3 and 4. The rear edge 28 of top plate 24 will be in its uppermost position wherein the rear end of tree receiving chamber will be of its maximum height dimension and the side wall 38 is fully retracted to define a chamber having converging walls. A Christmas tree 104 is then inserted, butt first, into the tree receiving chamber defined by the plates 14 and 24 and the side wall 38. Due to the angular relationship of the plate 24 to the bottom plate 14, the branches of the tree will be bent toward the tree top due to engagement with the top plate and the bottom plate. After the tree has been inserted the desired distance into the tree receiving chamber, the operator will actuate the proper valve to extend the motor 34 and lower the rear edge 28 of the top plate. The tree branches will now be further compressed between the plates 14 and 24 in the direction toward the tree top. Upon the plate 24 being positioned as shown in FIG. 5, the operator will actuate the hydraulic motor 56 to move the slide 48, and thus, the side wall 38, toward the tree. As the side wall 38 is moved toward the tree it will be obliquely related to the tree trunk due to its initial oblique relationship and the fact that the motor 56 and slide 48 is located adjacent the front edge 16 of plate 14. Thus, the tree branches at the butt end of the tree will be engaged first by wall 38 and folded toward the tree top. Further movement of the wall 38 will likewise fold the branches throughout the tree length engaged by the side wall. Upon the members 44 engaging member 62 the wall 38 will pivot about bolts 54 and rapidly slide the compressed tree into the wrapping chamber. The side wall position at the termination of extension of motor 56 will be as shown in dotted lines in FIG. 4 and as in FIG. 5. Due to the "floating" action of the side wall none of the tree branches will be excessively compressed and a substantially uniform pressure will be maintained on the tree. In the wrapping position the tree trunk will be moved to the left of shaft 80, as viewed in FIG. 4, and the branches of the tree will be compressed due to the tree being squeezed against the weight of the doors and the wall 38. Thereupon, the plate 55 will actuate the valve 105 controlling the hydraulic motor 102, and the operator will trip clutch 103 to rotate the shaft 80 through a single rotation. Initial rotation of the shaft 80 will pivot the levers 72 to insert the needles 76 through the slots 78 within the bottom plate, through the side wall 38 and up through the slots 84 within the upper plate wherein the ends of the needles will be positioned adjacent the knotters 82. Continued rotation of the shaft 80 will actuate the knotters to tie and cut the twine held by the needles and a band of twine will be passed about the folded tree at the location of each needle and knotter. For conventional size trees the passing of four bands of twine about the tree will maintain the branches in the compressed state. It will be appreciated that a greater or lesser number of knotters and needles could be added to the shafts 80 and 74, respectively, if desired.

After the wrapping and tying of the twine about the compressed tree is accomplished, the operator will actuate the valves to return the side wall 38 to the position of FIG. 3 and the upper plate 24 to its uppermost position. As the motor 56 is retracted the end of beams 44 will engage member 64 to pivot the wall 38 to its oblique relation ready to receive the next tree. The completion of the rotation of the shaft 80 will return the needles to the position of FIG. 3 wherein they are ready for the next cycle. The cycle is then repeated.

In that the tree previously wrapped will remain within the wrapping chamber while another tree is placed within the tree receiving chamber, the compression of the tree within the tree receiving chamber by the top plate 24, and the initial compression due to the movement of the side wall 38, takes place while two trees are supported upon the bottom plate 14. As the newly compressed tree is being moved toward the wrapping chamber by the side wall 38, it will engage the wrapped tree and force the wrapped tree to the right, FIG. 5, lifting the doors 68 and ejecting the wrapped tree over the edge 20 of the bottom plate. Thus, the wrapped tree will be automatically ejected from the wrapping chamber upon the newly compressed tree being located therein. The aforementioned wrapping cycle will be repeated and the operation of the side wall, top plate, and wrapping apparatus will take place with each tree. During each cycle one tree will be wrapped and a tree will be ejected from the wrapping chamber. It will be appreciated that a plurality of trees may be simultaneously placed within the wrapping chamber wherein it is desired to compress and wrap several trees together in one bundle. This is often desirable with the transporting of the smaller trees. Also, it is possible to wrap and package boughs by the use of the machine.

By the sequential operation and the relationship of the top plate 24 and the side wall 38, the invention has proven to be very gentle with the branches of Christmas trees, and has minimized the breakage which often occurs in the folding and wrapping of such trees. The needles and knotters and the associated shafts are of conventional construction of the type used with hay baling machines; thus, maintenance of the machine is readily accomplished. It has been found that as the compression and wrapping of a Christmas tree takes only a few seconds that substantial savings in the wrapping and folding of Christmas trees over heretofore known methods and means can be experienced, and the high degree of portability of the machine makes the efficient locating of the wrapping and folding operation possible.

It is appreciated that modifications to the described embodiment may be apparent to those skilled in the art without departing from the spirit and scope of the invention, and it is intended that the invention be defined only by the following claims.

We claim:

1. A tree folding and wrapping apparatus comprising, in combination, a tree folding chamber defined on said frame having a loading opening, said chamber being partially defined by a first plate pivotally mounted on said frame remote from said opening, a movable chamber wall transversely disposed to said first plate and pivotally mounted to said frame remote from said opening, means pivotally actuating said first plate, actuating means operably associated with said movable chamber wall, a wrapping chamber defined on said frame adjacent to said folding chamber wall and of a size to receive and maintain a tree in a folded state, and tree wrapping means operatively associated with said wrapping chamber adapted to wrap a folded tree therein.

2. A tree folding and wrapping apparatus comprising, in combination, a frame having a bottom plate defined thereon, said bottom plate including first and second portions, a top plate movably mounted on said frame in opposed spaced relation to said first bottom plate portion and movable toward and away from said bottom plate, a first wall movably mounted on said frame between said bottom and top plates, said plates and wall defining a tree folding chamber, a wrapping chamber of smaller dimension than said tree folding chamber defined on said frame adjacent to and open to said tree folding chamber in opposed relation to said first wall and adapted to receive said wall, an upper plate mounted on said frame in opposed spaced relation to said second bottom plate portion, said upper plate and said second bottom plate portion defining one cross-sectional dimension of said wrapping chamber, a second wall hinged on said frame in opposed relation to said first wall wherein said first and second walls define the other cross-sectional dimension of said wrapping chamber during wrapping of said tree, means operatively associated with said top plate and said first wall for the actuation thereof, and wrapping and tying means operatively associated with said wrapping chamber wrapping a tree forced within said wrapping chamber by said first wall.

3. A tree folding and wrapping apparatus comprising, in combination, a frame, a horizontally disposed bottom plate mounted upon said frame having front and rear portions, a top plate pivotally mounted upon said frame in spaced opposed relation to a first portion of said bottom plate having a pivot axis parallel to said bottom plate and disposed above the front portion of said bottom plate, actuating means operably associated with said top plate, a vertically disposed first wall mounted on said frame for horizontal movement between said bottom and top plates, actuating means operably associated with said wall, an upper plate mounted on said frame disposed above a second portion of said bottom plate and adjacent said top plate, the spacing of said upper plate above said bottom plate substantially corresponding to the minimum spacing of said top plate thereabove in the down pivoted position of said top plate, a second wall interposed between said upper and bottom plates and in opposed relation to said first wall, said upper and bottom plates and said second wall defining a wrapping chamber, and wrapping means mounted on said frame operatively associated with said wrapping chamber adapted to wrap a folded tree therein.

4. In a tree folding and wrapping apparatus as in claim 3 wherein vertically disposed pivot bearing means are mounted on said frame and pivot pin means are mounted on said first wall received within said bearing means pivotally mounting said first wall on said frame.

5. In a tree folding and wrapping apparatus as in claim 4 wherein pivot bearing support means are mounted on said frame movable transversely to said first wall, said bearing means being mounted upon said bearing support means and said actuating means associated with said first wall operably positioning said bearing support means.

6. In a tree folding and wrapping apparatus as in claim 4 wherein a guideway is mounted upon said frame transversely disposed to said first wall, a slide movably mounted within said guideway, said vertically disposed pivot bearing means being mounted upon said slide and said actuating means associated with said first wall for operably positioning said slide.

7. In a tree folding and wrapping apparatus as in claim 3, hinge means pivotally connecting said second wall to said frame adjacent said upper plate remote from said first wall whereby said second wall may be opened for removal of a wrapped tree from said wrapping chamber.

8. A tree folding and wrapping machine comprising, in combination, a frame, a horizontally disposed bottom plate mounted upon said frame having front and rear edges and first and second opposed lateral side edges, a top plate pivotally mounted on said frame above a first portion of said bottom plate and having a pivot axis substantially parallel to said bottom plate and spaced above said bottom plate front edge, actuating means mounted on said frame operably associated with said top plate controlling the pivoting thereof, a pivot bearing support movably mounted on said frame adjacent said front edge in a direction parallel to said bottom plate toward and away from said lateral side edges thereof, actuating means operably associated with said bearing support for the positioning thereof, a first vertically disposed wall freely pivotally mounted on said bearing support for movement parallel to said bottom plate and between said top and bottom plates, a horizontally disposed upper plate mounted on said frame adjacent said top plate and in spaced relation above a second portion of said bottom plate, said first wall adapted to be received between said upper and bottom plates, a second wall mounted on said frame in opposed relation to said first wall, said second wall being hinged to said frame above the second lateral side edge of said bottom plate and wrapping means mounted on said frame adapted to wrap a tree maintained in a folded state between said upper and bottom plates and said first and second walls upon said first wall being positioned under said upper plate.

9. In a tree folding and wrapping apparatus as in claim 8 wherein said wrapping means includes a shaft rotatably journaled on said frame adjacent said second lateral side edge, a plurality of spaced twine threading needle members mounted on said shaft, said bottom plate and said first wall having needle receiving slots defined therein, said upper plate having needle receiving slots defined therein and twine knotters mounted on said frame above said upper plate.

10. In a tree folding and wrapping machine as in claim 8, wherein said pivot bearing support includes a guideway mounted on said frame transversely disposed to said first wall, a slide movably supported within said guideway and first wall pivot bearing means mounted on said slide, said bearing support actuating means being operatively associated with said slide.

11. A tree folding and wrapping apparatus comprising, in combination, a frame, a tree folding chamber defined on said frame having a loading opening, said chamber being partially defined by a first plate pivotally mounted on said frame remote from said opening, a movable side wall partially defining said chamber perpendicularly related to said first plate, means pivotally mounting said side wall upon said frame upon a pivot axis perpendicular to the pivot axis of said first plate and remote from said opening, guide means translating the side wall pivot axis parallel to the plate pivot axis, actuating means operatively associated with said first plate and said side wall pivot mounting means, a wrapping chamber defined on said frame adjacent said folding chamber having a loading opening in opposed relation to said side wall and of a size to receive and maintain a tree in a folded state and tree wrapping means operatively associated with said wrapping chamber adapted to wrap a folded tree therein.

References Cited in the file of this patent

UNITED STATES PATENTS

| 1,037,781 | Longdon | Sept. 3, 1912 |
|---|---|---|
| 2,831,422 | Black et al. | Apr. 22, 1958 |
| 2,953,084 | Eidson et al. | Sept. 20, 1960 |
| 2,974,457 | Saxton | Mar. 14, 1961 |
| 3,017,730 | Rodish | Jan. 23, 1962 |

FOREIGN PATENTS

| 535,019 | Belgium | July 20, 1955 |
|---|---|---|
| 650,785 | Canada | Oct. 23, 1962 |